(12) United States Patent
Thormaehlen

(10) Patent No.: US 7,890,937 B2
(45) Date of Patent: Feb. 15, 2011

(54) DATA PROCESSING SYSTEM AND METHOD

(75) Inventor: Frederik Thormaehlen, Mannheim (DE)

(73) Assignee: SAP AG, Walldorf (DE)

( * ) Notice: Subject to any disclaimer, the term of this patent is extended or adjusted under 35 U.S.C. 154(b) by 1270 days.

(21) Appl. No.: 11/407,696

(22) Filed: Apr. 19, 2006

(65) Prior Publication Data

US 2006/0271849 A1 Nov. 30, 2006

(30) Foreign Application Priority Data

Apr. 19, 2005 (EP) .................................. 05008513

(51) Int. Cl.
*G06F 9/45* (2006.01)

(52) U.S. Cl. ..................................... 717/136

(58) Field of Classification Search .................. 717/136
See application file for complete search history.

(56) References Cited

U.S. PATENT DOCUMENTS

| | | | |
|---|---|---|---|
| 5,734,837 A | 3/1998 | Flores et al. | |
| 6,170,081 B1* | 1/2001 | Fontana et al. | 717/104 |
| 6,550,054 B1* | 4/2003 | Stefaniak | 717/104 |
| 7,533,107 B2* | 5/2009 | Gupta et al. | 1/1 |
| 7,676,786 B2* | 3/2010 | Shenfield et al. | 717/104 |
| 2003/0188293 A1* | 10/2003 | Boucher | 717/114 |
| 2003/0227392 A1* | 12/2003 | Ebert et al. | 340/825.49 |
| 2004/0015834 A1* | 1/2004 | Mestre et al. | 717/106 |
| 2005/0204347 A1* | 9/2005 | Jurkiewicz et al. | 717/137 |
| 2006/0017947 A1* | 1/2006 | Wang et al. | 358/1.13 |

OTHER PUBLICATIONS

Anonymous, "Workflow Process Definition Interface—XML Process Definition Language Version 1.0", Workflow Management Coalition Workflow Standard—Document No. WFMC-TC-1025, [online] Oct. 25, 2002, pp. 4(6)-7(9). Retrieved from the Internet: <URL: http://www.wfmc.org/standards/docs/TC-1025_10xpdl_102502.pdf> [retrieved on Jan. 8, 2009].
Frankel, D. "BPM and MDA: The Rise of Model-Driven Enterprise Systems", Business Process Trends Whitepaper, [Online[Jun. 2003. Retrieved from the Internet: <URL: http://www.bptrends.com/publicationfiles/06-03%20WP%20BPM%20and%20MDA%20Whitepaper%20Frankel11.pdf> [retrieved on Dec. 30, 2008].

(Continued)

*Primary Examiner*—John Chavis
(74) *Attorney, Agent, or Firm*—Fish & Richardson P.C.

(57) ABSTRACT

The present invention relates to a data processing system including a first file converter converting a set of file formats into an extended markup language format, a software development tool, and a workflow processing system. The software development tool includes a second file converter for rendering the extended markup language format into a unified modeling language graphic, a renderer for rendering a unified modeling language format converted file, a modifier for graphic modification of the rendered file, a third file converter converting the unified modeling language format to the extended markup language format, and means for deploying an extended markup language format converted file to the workflow processing system. The present invention enables to provide a meta workflow system that can be implemented on the level of existing workflow systems by integration.

18 Claims, 4 Drawing Sheets

OTHER PUBLICATIONS

Jürgen, J., "Mapping of Business Process Models to Workflow Schemata—An Example Using MEMO-orgML and XPDL" Arbeitsberichte des Instituts Für Wirtschaftsinformatik—Universität Koblenz-Landau, [Online] No. 47, Apr. 2004, 53 pages. Retrieved from the Internet: <URL: http://www.uni-koblenz.de/~iwi/publicfiles/Arbeitsberichte/Nr47.pdf> [retrieved on Dec. 30, 2008].

Mohan, R. et al., "A State Machine Approach for a Process Driven Development of Web-Application", Lecture Notes in Computer Science, Springer Verlag, New York, NY, US, vol. 2348 (2002), pp. 52-66.

SAP AG, European Search Report of Corresponding European Patent Application No. 05008513.3 dated Aug. 3, 2006, 6 pages.

\* cited by examiner

DATA PROCESSING SYSTEM AND METHOD

CROSS REFERENCE TO RELATED APPLICATIONS

The present application claims priority under 35 U.S.C. §119 to European Patent Application No. 05 008 513.3, filed Apr. 19, 2005 entitled A DATA PROCESSING SYSTEM AND METHOD, the disclosure of which is incorporated herein by reference.

BACKGROUND

The present invention relates to the field of data processing, and more particularly to the field of software development tools.

The unified modeling language (UML) is a graphical language for visualizing, specifying, constructing, and documenting the artifacts of a software-intensive system. The UML offers a standard way to write a system's blueprints, including conceptual things such as business processes and system functions as well as concrete things such as programming language statements, database schemas, and reusable software components.

The UML specification March 2003, version 1.5, formal/03-0301 (http://www.omg.org/docs/formal/03-03-01.pdf) encompasses UML activity diagrams (cf. part 10, pages 3-155 to 3-169 of the UML specification). A UML activity diagram is a variation of a state machine in which the states represent the performance of actions or sub-activities and the transitions are triggered by the completion of the actions or sub-activities.

The entire UML activity diagram is attached to a classifier, such as a use case, or to a package, or to the implementation of an operation. The purpose of this UML activity diagram is to focus on flows driven by internal processing—as opposed to external events.

UML activity diagrams are the object-oriented equivalent of flowcharts that allow to visualize the flow of events from one activity to another. They are often used to model workflows or business processes.

U.S. Pat. No. 5,734,837 shows a method and system which provides consultants, business process analysts, and application developers with a tool with which to conduct business process analysis, design, documentation and to generate business process definitions and workflow-enabled applications. This can be implemented using a software system which has two functional sets. One is a set of graphical tools that can be used by a developer or business analyst to map out business processes. The second is a set of tools that can be used to document and specify in detail the attributes of each workflow definition, including roles, cycle time, conditions, of satisfaction, cost and value, associated text, forms, application data as well as detail the attributes of links between workflows required to complete a business process map, and to generate a business process definition and a workflow-enabled application. This also includes a workflow language scripting capability.

SUMMARY

In accordance with the present invention there is provided a data processing system that has first file conversion means for converting a set of file formats into an extended markup language format, a software development tool, and a workflow processing system, wherein the software development tool has second file conversion means for rendering the extended markup language format into a unified modeling language format, means for graphic modification of the rendered file, third file conversion means for converting the unified modeling language format to the extended markup language format, and means for deploying an extended markup language format converted file to the workflow processing system, the extended markup language converted file being a process description template.

The present invention is particularly advantageous as the software development tool uses an extended markup language (XML) format that can be rendered in a unified modeling language (UML) format. This XML format definition provides a target format for file format conversions of legacy files and also a format for creating new UML activity diagrams. Thus, it becomes possible to maintain and modify process description files of legacy systems by means of a single software development tool and to create new process descriptions using the same software development tool.

Further, the present invention is particularly advantageous in that the software development tool and the workflow processing tool are integrated; the XML process description file that has been generated by the software development tool by UML to XML conversion can be directly deployed to the workflow processing system. This seamless integration of the software development tool and the workflow processing system greatly reduces the programming effort and expense for implementing a workflow processing system and provides a maximum degree of flexibility regarding potential modifications of the processes to be executed by the workflow processing system.

In accordance with an embodiment of the invention the data processing system has a graphical user interface for the software development tool. By means of this graphical user interface a software developer can select a legacy file for importation into the software development tool. The selected process description file from a legacy system is converted into the XML format used by the software development tool by means of a respective converter functionality.

In accordance with another embodiment of the invention, an XML process description template can be converted from the XML format into a legacy format for deployment to the respective legacy system. This has the advantage that maximum use can be made of existing legacy systems while the cost for the software maintenance of these legacy systems is greatly reduced as the single software development tool of the present invention can be used for a variety of such legacy systems.

In accordance with an embodiment of the invention the data processing system has another graphical user interface for the workflow processing system. By means of this graphical user interface a user can select one of the deployed XML process templates for instantiation and initialization of the respective workflow processing.

In accordance with an embodiment of the invention the workflow processing system is coupled to various application programs and/or web services. The application programs and/or web services perform one or more of the steps of the workflow. For example, the majority of the processing steps is not performed by the workflow processing system itself but by external applications and/or web services; in this instance the workflow processing system coordinates the various external applications and web services in order to perform the required data processing steps as specified in the user selected XML process template.

In another aspect the present invention relates to a data processing method comprising converting a legacy process description file into an extended markup language process description template, converting the extended markup language process description template into a unified modeling language format, rendering the unified modeling language format converted process description template, graphic modification of the rendered process description template, converting the modified process description template from the unified modeling language format to the extended markup language format, and deployment of the extended markup language format converted modified process description template to a workflow processing system.

In still another aspect the present invention relates to a computer program product for performing such a data processing method.

The present invention enables to provide a meta workflow system that can be implemented on the level of existing workflow systems by integration. Further, new business processes can be designed on the basis of existing workflow systems and services that are provided via the Internet, such as web services.

In particular, this enables to modify and/or combine existing workflows of legacy systems for the creation of a new workflow.

Further, the present invention is particularly advantageous in that it provides a uniform software development platform that is based on UML; thus a software developer does not need to know various workflow formats.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

In the following preferred embodiments of the invention will be explained in greater detail by way of example only making reference to the drawings in which.

Like reference symbols in the various drawings indicate like elements.

DETAILED DESCRIPTION

Figure 1:
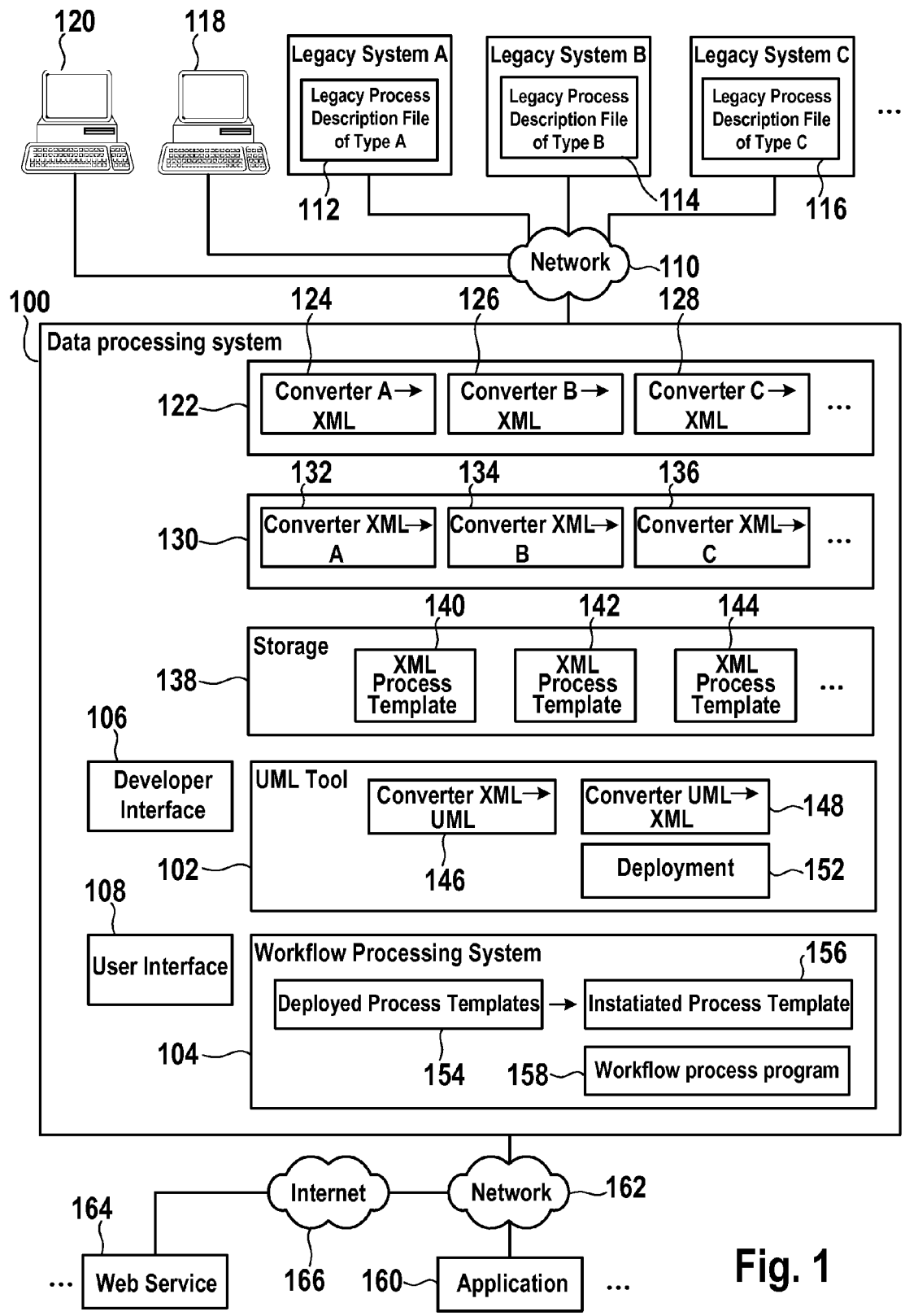
FIG. 1 is a block diagram of an embodiment of a data processing system of the invention.

FIG. 1 shows a data processing system 100 that has a software development tool 102 that uses UML and a workflow processing system 104 that is used for workflow processing in accordance with XML process templates.

The data processing system 100 includes a developer interface 106, i.e. a graphical user interface for the software development tool 102, and a user interface 108 for the workflow processing system 104.

The data processing system 100 can be coupled to a number of legacy workflow processing systems A, B, C, etc., via a network 110. Legacy system A uses a file type A for its process description files; the legacy system B uses a file type B for its process description files, and the legacy system C uses a file type C for its process description files. For example, the legacy system A includes a process description file 112, the legacy system B includes a process description file 114, and the legacy system C includes a process description file 116, etc. A personal computer 118 of a software developer is coupled to the data processing system 100 via the network 110 as well as a personal computer 120 of a user of the workflow processing system 104.

The data processing system 100 has a set 122 of converters for converting the various legacy file types into an XML format used by the data processing system 100. For example, the set 122 includes a converter 124 for format conversion from the format A to XML, a converter 126 for format conversion from the format B to XML and a converter 128 for format conversion of format C to XML, etc.

Further, the data processing system 100 has a set 130 of converters for format conversion in the inverse direction, i.e. from the XML format of the data processing system 100 into various formats used by the legacy systems. For example, the set 130 has a converter 132 for format conversion from XML to the format A, a converter 134 for format conversion from XML to format B, and a converter 136 for format conversion from XML to format C, . . .

The data processing system 100 has storage 138 for storage of XML process templates 140, 142, 144, etc., that are in compliance with the XML format definition used by the data processing system 100.

The software development tool 102 has a converter 146 for XML to UML format conversion and a converter 148 for conversion in the reverse direction, i.e. from UML to XML. The converter 146 serves for reading an XML file from mass storage, converting the XML file, and storing the converted XML file in the main memory for the purpose of rending the XML file as a UML activity diagram. Further, the software development tool 102 has a deployment component 152 for deployment of one of the XML process templates stored in the storage 138 to the workflow processing system 104. The workflow processing system 104 holds the deployed XML process templates 154. By means of the user interface 108 a user can select one of the deployed XML process templates 144 for instantiation and for initiation of the respective workflow processing. This creates an instantiated process template 156 that can be processed by the workflow process program 158 of the workflow processing system 104.

A number of application programs 160 can be coupled to the data processing system 100 via the network 162 and/or a number of web services 164 that are coupled to the network 162 by means of the Internet 166. For example, the networks 110 and/or 162 are private networks, such as a company's intranet; the networks 110 and 162 can be identical. For example, the network 162 and the Internet 166 are separated by a firewall.

In operation the software developer can select one of the legacy process description files 112, 114, 116, etc., for importation into the software development tool 102 via the developer interface 106. Without restriction of generality it is assumed in the following by way of example only that the developer selects the process description file 114 of the legacy system B. In response to the software developer's selection of the process description file 114, the process description file 114 is converted from its file format B to the XML format used by the data processing system 100 by the converter 126. The resultant XML process template 140 is stored in the storage 138. The developer can then select the imported and converted XML process template 140 for viewing and/or modifying. In response to the developer's selection of the XML process template 140 via the developer interface 106 the XML process template 140 is converted from XML to UML by means of the converter 146 for rendering as a UML activity diagram. This enables a software developer to view and/or modify the rendered UML activity diagram. After modification of the UML activity diagram, the modifications can be stored in the XML File. This invokes the converter 148 for UML to XML conversion. The modified XML process template can be stored by overwriting the original XML process template 140 or it can be stored as an additional XML process template 142 in order to keep the original XML process template 140 in the storage 138.

For deployment of one of the XML process templates stored in the storage 138, the software developer can select one of the XML process templates, such as the XML process template 142, for deployment. This invokes the deployment component 152 that deploys the selected XML process template 142 to the workflow processing system 104 such that the XML process template 142 is added to the deployed process templates 154 of the workflow processing system 104.

A user can select one of the deployed process templates 154 via the user interface 108 from the personal computer 120. Selection of one of the deployed process templates 154 instantiates the selected process template such that an instantiated process template 156 results. This starts workflow processing of the instantiated process template 156 by means of the workflow process program 158. Preferably, the workflow process program 158 uses one or more of the application programs 160 and/or web services 164 for performing various process steps.

As an option, the software developer can also choose to transform one of the XML process templates stored in the storage 138 back into the format of one of the legacy systems. For example, the software developer can select the modified XML process template 142 for conversion back into the format B. In response the format conversion from XML to format B is performed by the converter 134 and the resultant process description file of format B is exported to the legacy system B via the network 110 for execution.

As a further option, one or more of the legacy process description files can be combined for definition of a new workflow. For example, the legacy process description file 112 is loaded into the data processing system, XML converted, rendered as a UML activity diagram and modified. The modified UML activity diagram can be deployed on e.g. the legacy system A by the data processing system 100 as part of the workflow to be implemented. In other words, the data processing system can use any combination of legacy process description files and/or external application programs 160 and/or web services 164 for implementation of a workflow; in this instance the data processing system 100 coordinates the execution of the deployed elements of the workflow.

Figure 2:
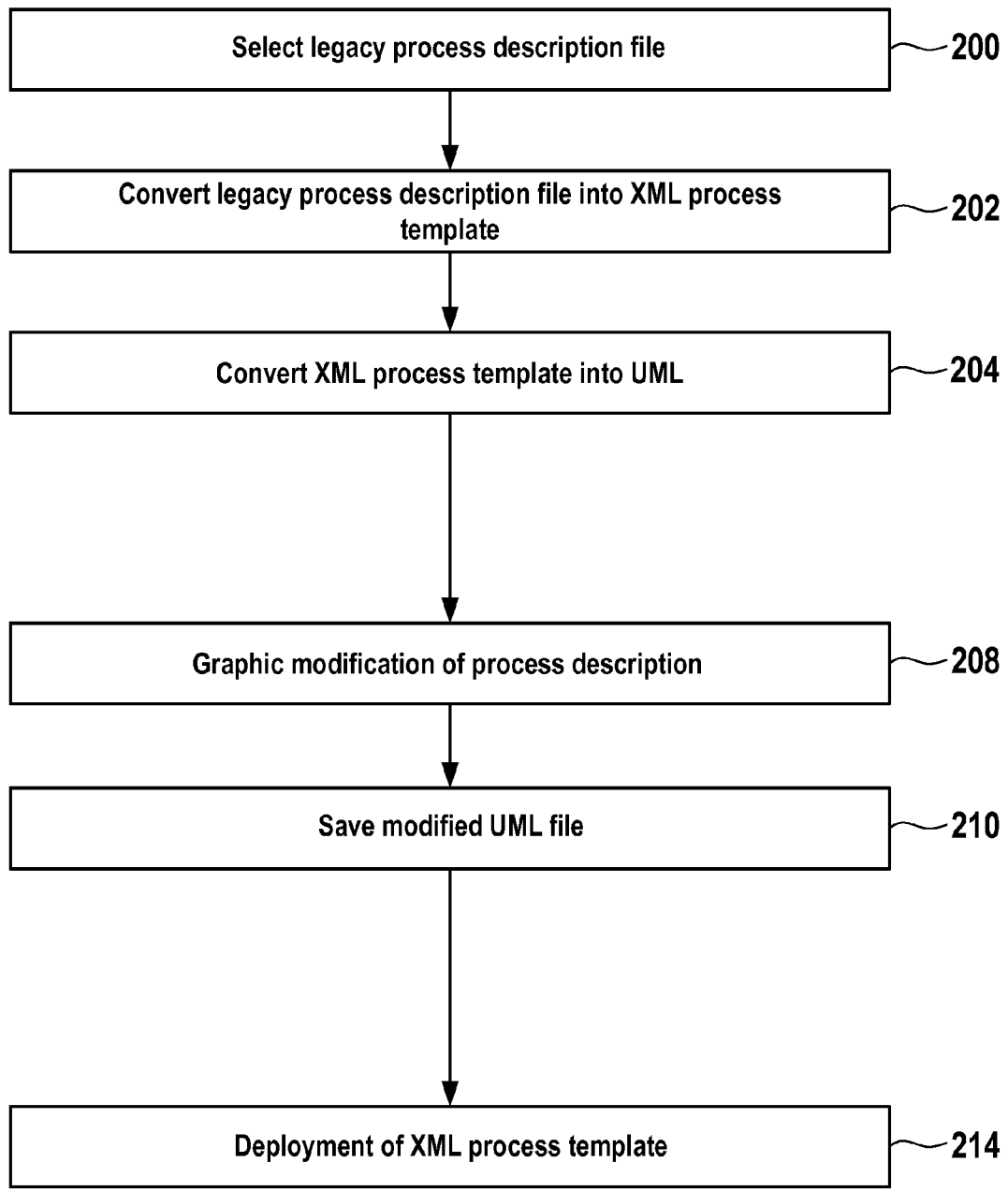
FIG. 2 is a flowchart illustrating the importation and modification of a legacy process description file.

FIG. 2 shows a corresponding flowchart illustrating the steps involved from the selection of a legacy process description file to deployment of the resultant XML process template. In step 200 a legacy process description file is selected from one of the legacy systems coupled to the data processing system. In response the selected legacy process description file is converted into an XML process template that is in compliance with the XML format definition used by the data processing system. In step 204 the XML process template is converted into UML for rending the respective UML activity diagram. In step 208 a software developer can modify the process description by graphic modification of the UML activity diagram. In step 210 the modified UML activity diagram is saved as a XML process template. In step 214 the XML process template created in step 212 can be selected for deployment to the workflow processing system.

Figure 3:
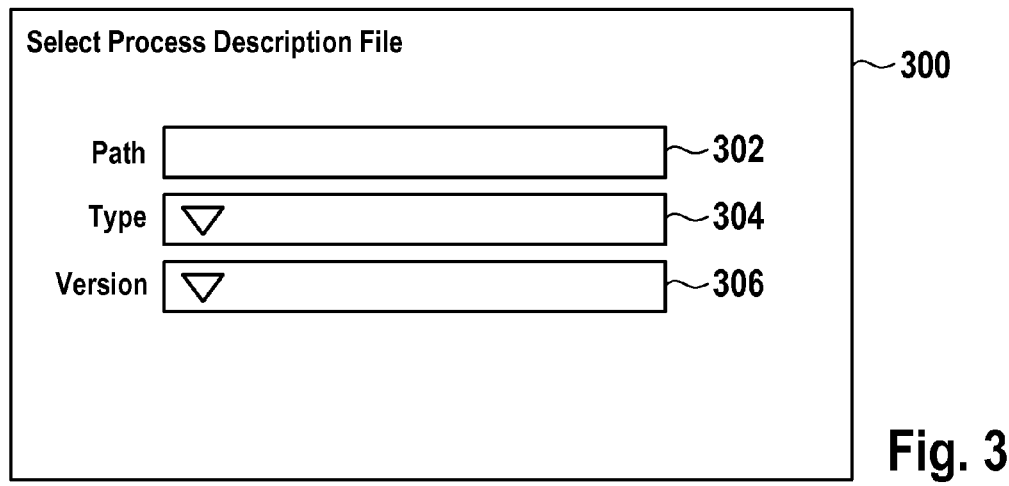
FIG. 3 is a window of a graphical user interface for selecting a legacy process description file for importation.

FIG. 3 shows a window 300 of the developer interface 106 (cf. FIG. 1). The window 300 serves for selection of a legacy process description file for importation into the data processing system. The window 300 has a data entry field 302 for entry of a path to the selected legacy process description file. A pull-down menu 304 serves for entry of the type or format of the legacy process description file. The pull-down menu 306 serves for selection of the format version. Based on the type/format and version entry a respective converter of the set 122 is selected for conversion of the legacy process description file identified by the path entered into the data entry field 302.

Figure 4:
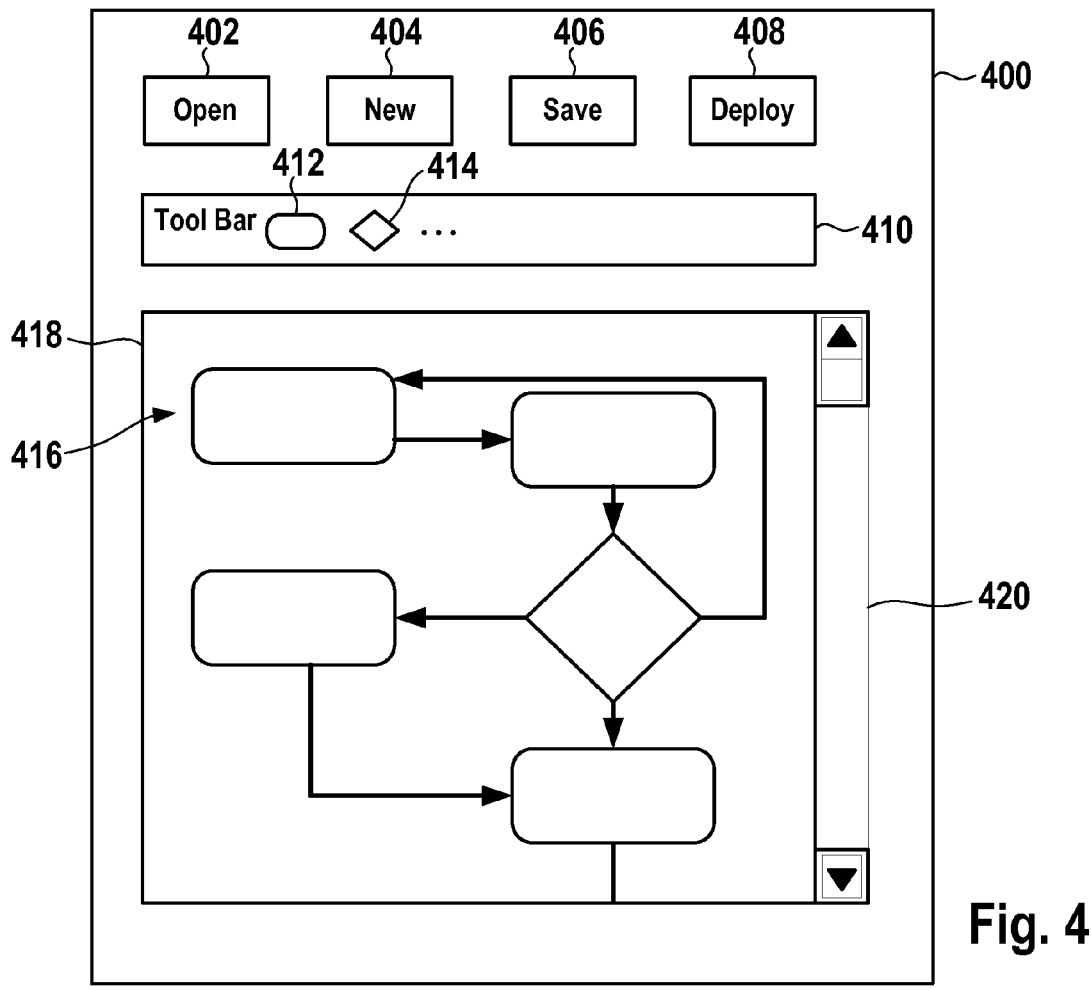
FIG. 4 is a window of the software development tool that schematically shows a UML activity diagram.

FIG. 4 shows a window 400 of the developer interface 106 (cf. FIG. 1). The window 400 has virtual control buttons 402 for opening one of the XML process templates, a button 404 for creating a new XML process template, a button 406 for saving an XML process template and a button 408 for deployment of one of the XML process templates.

The window 400 has a toolbar 410 containing various graphical language elements 412, 414, etc., for modification of a UML activity diagram 416 that is rendered in the sub-window 418 of the window 400. The sub-window 418 has a vertical scrollbar 420.

In operation the software developer can select one of the XML process templates from the storage 138 by clicking on the button 402. In response the selected XML process template is converted to UML and the respective UML activity diagram 416 is rendered in the sub-window 418. The software developer can then modify the process description using one or more of the graphical language elements 412, 414, etc., contained in the toolbar 410.

In order to save the modifications, the software developer can press the button 406 in order to overwrite the original XML process template or to store a new XML process template containing the modifications. For deployment of one of the XML process templates the software developer clicks on the button 408. In order to create a completely new XML process template the user clicks on the button 404 which will open up an empty UML activity diagram. After entering the process description using the graphical language elements 412, 414, etc., contained in the toolbar 410 the software developer can save the newly created process description as an XML process template by clicking on the button 406.

Figure 5:
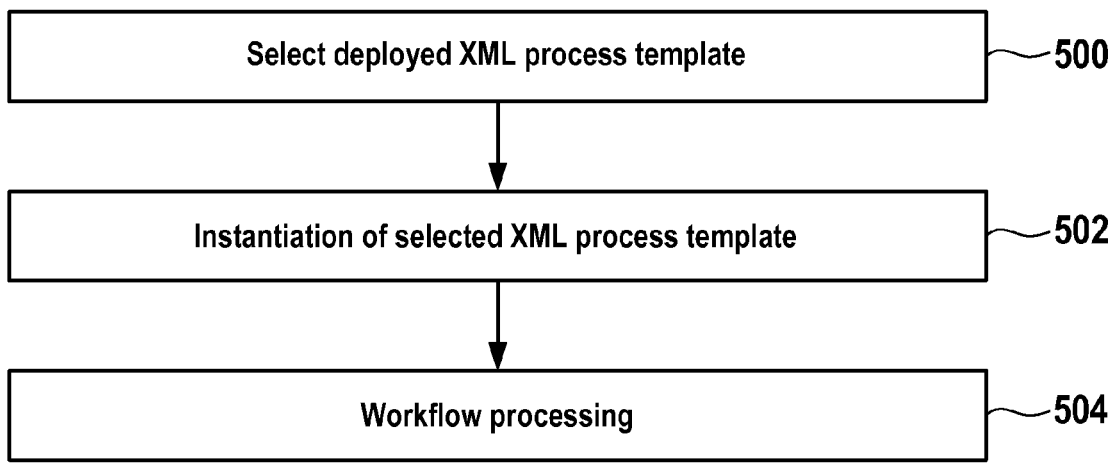
FIG. 5 is a flowchart illustrating the deployment of an XML process template to the workflow processing system.

FIG. 5 is a flowchart illustrating the initialization of workflow processing. In step 500 a user selects one of the deployed process templates that are held by the workflow processing system. In response the selected process template is instantiated (step 502) and workflow processing is initiated in step 504.

Figure 6:
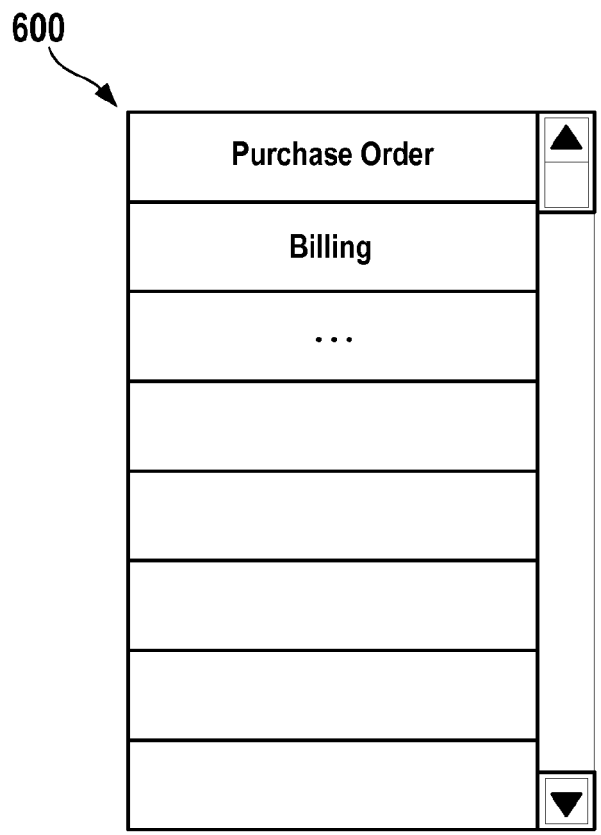
FIG. 6 shows a window for selection of deployed XML process templates.

FIG. 6 shows a window 600 that has a vertical scrollbar 602 for a user's selection of one of the deployed process templates, such as a process template for generating a purchase order, for billing a client, or for various other processes. By clicking on one of the items shown in the window 600, the user selects the respective process template (cf. step 500 of FIG. 5), which instantiates the selected process template and initiates the workflow processing.

Although a few embodiments have been described in detail above, other modifications are possible. The logic flows depicted in the figures do not require the particular order shown, or sequential order, to achieve desirable results. Other embodiments may be within the scope of the following claims.

The invention claimed is:

1. A data processing system comprising:
   first file conversion means for converting a set of file formats into an extended markup language format;
   a software development tool; and
   a workflow processing system;
   wherein the software development tool comprises second file conversion means for rendering the extended markup language format into a unified modeling language format, means for graphic modification of the rendered file, third file conversion means for converting the unified modeling language format to the extended markup language format, and means for deploying an extended markup language format converted file to the workflow processing system.

2. The data processing system of claim 1, further comprising a first graphical user interface providing a selection of a legacy file having one of the file formats of the set of file formats.

3. The data processing system of claim 1, further comprising fourth file conversion means for converting the extended markup language format into a selected file format of the set of file formats.

4. The data processing system of claim 2, further comprising a second graphical user interface providing a selection of one of the deployed extended markup language format converted files for instantiation thereof and initialization of respective workflow processing by the workflow processing system.

5. The data processing system of claim 1, further comprising the workflow processing system being coupled to a set of application programs (160) for execution of the instantiated process.

6. The data processing system of claim 1, further comprising the workflow processing system being coupled to a set of web services for execution of the instantiated process.

7. A data processing method comprising:
   converting a legacy process description file into an extended markup language process description template;
   rendering the extended markup language process description template in a unified modeling language format;
   graphically modifying the rendered process description template;
   converting the modified process description template from the unified modeling language format to the extended markup language format; and
   deploying the extended markup language format converted modified process description template to a workflow processing system.

8. The data processing method of claim 7, further comprising selecting one of the legacy process description files having a file format of a predefined set of file formats by means of a software developer's graphical user interface.

9. The data processing method of claim 7, further comprising converting one of the extended markup language process description templates that has been obtained by converting the unified modeling language format to the extended markup language format into a selected one of the set of file formats.

10. The data processing method of claim 7, further comprising selecting one of the deployed extended markup language format converted files for instantiation thereof and initialization of respective workflow processing by the workflow processing system.

11. The data processing method of claim 7, further comprising using one or more web services for performing one or more of the steps of the workflow processing.

12. The data processing method of claim 7, further comprising selecting one or more legacy process description files for definition of a combined workflow.

13. A computer program product tangibly embodied in an information carrier, the computer program product including instructions that, when executed, perform operations for data processing, the operations comprising:
   converting a legacy process description file into an extended markup language process description template;
   rendering the extended markup language process description template in a unified modeling language format;
   graphically modifying the rendered process description template;
   converting the modified process description template from the unified modeling language format to the extended markup language format; and
   deploying the extended markup language format converted modified process description template to a workflow processing system.

14. The computer program product of claim 13, the operations further comprising selecting one of the legacy process description files having a file format of a predefined set of file formats by means of a software developer's graphical user interface.

15. The computer program product of claim 13, the operations further comprising converting one of the extended markup language process description templates that has been obtained by converting the unified modeling language format to the extended markup language format into a selected one of the set of file formats.

16. The computer program product of claim 13, the operations further comprising selecting one of the deployed extended markup language format converted files for instantiation thereof and initialization of respective workflow processing by the workflow processing system.

17. The computer program product of claim 13, the operations further comprising using one or more web services for performing one or more of the steps of the workflow processing.

18. The computer program product of claim 13, the operations further comprising selecting one or more legacy process description files for definition of a combined workflow.

* * * * *